(12) United States Patent
Bragg et al.

(10) Patent No.: US 8,787,394 B2
(45) Date of Patent: Jul. 22, 2014

(54) SEPARATE ETHERNET FORWARDING AND CONTROL PLANE SYSTEMS AND METHODS WITH INTERIOR GATEWAY ROUTE REFLECTOR FOR A LINK STATE ROUTING SYSTEM (75) Inventors: Nigel L. Bragg, Weston Colville (GB); Ian H. Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 777 days.

(21) Appl. No.: 13/018,944

(22) Filed: Feb. 1, 2011

(65) Prior Publication Data
US 2012/0195319 A1    Aug. 2, 2012

(51) Int. Cl.
*H04L 12/46* (2006.01)

(52) U.S. Cl.
USPC .......................................... 370/401; 709/249

(58) Field of Classification Search
None
See application file for complete search history.

(56) References Cited

U.S. PATENT DOCUMENTS

| | | | |
|---|---|---|---|
| 6,018,625 A | 1/2000 | Hayball et al. | |
| 6,587,469 B1 | 7/2003 | Bragg | |
| 6,704,307 B1 | 3/2004 | Graves et al. | |
| 7,590,123 B2* | 9/2009 | Asati et al. | 370/395.53 |
| 7,688,756 B2 | 3/2010 | Allan et al. | |
| 2002/0184388 A1* | 12/2002 | Yaseen et al. | 709/242 |
| 2004/0034702 A1 | 2/2004 | He | |
| 2004/0059829 A1 | 3/2004 | Chu et al. | |
| 2005/0177636 A1* | 8/2005 | Jamieson et al. | 709/226 |
| 2005/0220096 A1 | 10/2005 | Friskney et al. | |
| 2005/0262264 A1 | 11/2005 | Ando et al. | |
| 2006/0029032 A1 | 2/2006 | Allan et al. | |
| 2006/0083215 A1 | 4/2006 | Uttaro | |
| 2007/0047540 A1 | 3/2007 | Bragg et al. | |
| 2007/0053284 A1* | 3/2007 | Hu | 370/217 |
| 2007/0076719 A1 | 4/2007 | Allan et al. | |
| 2007/0165657 A1 | 7/2007 | Smith et al. | |
| 2008/0002588 A1* | 1/2008 | McCaughan et al. | 370/238 |
| 2008/0062891 A1* | 3/2008 | Van der Merwe et al. | 370/254 |
| 2008/0080509 A1 | 4/2008 | Khanna et al. | |
| 2008/0092229 A1 | 4/2008 | Khanna et al. | |
| 2008/0095047 A1 | 4/2008 | Skalecki et al. | |
| 2010/0020797 A1 | 1/2010 | Casey et al. | |
| 2011/0142053 A1* | 6/2011 | Van Der Merwe et al. | 370/395.1 |
| 2012/0093166 A1* | 4/2012 | Rosenberg et al. | 370/401 |
| 2012/0113991 A1* | 5/2012 | Satterlee et al. | 370/401 |
| 2013/0242802 A1* | 9/2013 | Qian et al. | 370/254 |

* cited by examiner

*Primary Examiner* — Hassan Phillips
*Assistant Examiner* — Duc Duong
(74) *Attorney, Agent, or Firm* — Clements Bernard PLLC; Christopher L. Bernard; Lawrence A. Baratta, Jr.

(57) ABSTRACT

The present disclosure provides a separate Ethernet forwarding and control plane system, method, network, and architecture with a Link State Interior Gateway route reflector for the control plan system and a layer two network architecture for the forwarding system. The present invention optionally utilizes a cloud implementation for the Designated Router (DR) or designated peering node reducing peering requirements and distributing the functionality. Through the architecture of the present invention, the Provider router is obviated by the application of layer two switches and servers. Such an architecture provides improved scaling, performance, and cost reduction.

10 Claims, 9 Drawing Sheets

SEPARATE ETHERNET FORWARDING AND CONTROL PLANE SYSTEMS AND METHODS WITH INTERIOR GATEWAY ROUTE REFLECTOR FOR A LINK STATE ROUTING SYSTEM

FIELD OF THE INVENTION

The present invention relates generally to networking. More particularly, the present invention relates to a separate Ethernet forwarding and control plane system, method, network, and architecture with an Interior Gateway route reflector associated with a Link State Routing System, such as Open Shortest Path First (OSPF) or Intermediate System to Intermediate System (IS-IS), for the control plane system, and a layer two network architecture for the forwarding system.

BACKGROUND OF THE INVENTION

In Multi-Protocol Label Switching (MPLS), a P router or Provider Router is a Label Switch Router (LSR) that functions as a transit router of the core network. The P router typically connected to one or more Provider Edge (PE) routers. In conventional embodiments, P routers and PE routers each operate a control plane and a forwarding plane and each of the routers forms a direct adjacency with every other router to which it is directly attached at the IP layer. An important function of the P router transit function is to limit the number of direct IP adjacencies required, by connecting each of the numerous PE routers only to a subset of the much smaller number of P routers, and connecting the P routers to each other. It would be advantageous to eliminate the need for the P routers, but this would require every PE router to form a direct adjacency with many if not all other PE routers. Disadvantageously, the requirement for direct adjacency poses scaling challenges. For example, with thousands of PE routers in an area, the adjacency count per PE router would be of the same order, which is substantially in excess of the adjacency count which can be supported by a conventional router implementation using an embedded control plane. What is needed is an alternative architecture, system, method, and the like replacing the P router architecture enabling scaling and efficiency in operation between PE routers.

Figure 1:
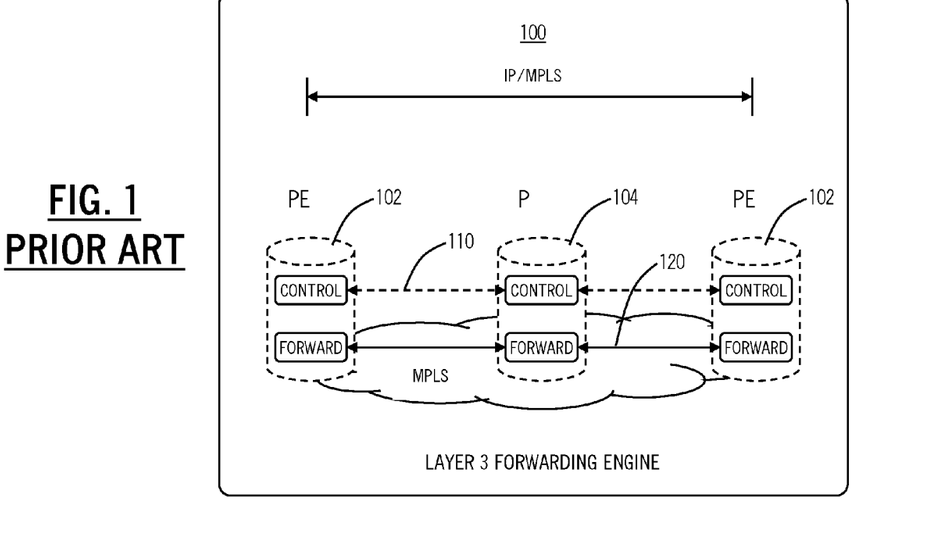
FIG. 1 is a an IP/MPLS network with PE routers and P routers in a conventional embodiment with a combined control and forwarding plane.

Referring to FIG. 1, in a conventional embodiment, an Internet Protocol (IP)/MPLS network 100 is illustrated with PE routers 102 and P routers 104. Here, the PE routers 102 and the P router 104 are interconnected exchanging packets therebetween. Further, the exchanged packets included both control packets and data packets, i.e. there is a control plane 110 and a forwarding plane 120 between the routers 102, 104. In this conventional embodiment, control packets (i.e. the control plane 110) peer with the P routers 104 in a hierarchical arrangement. As described herein, such an architecture can be scaled, but only at the expense of the complexity and cost of preserving the P routers. As an improvement, the concept of a Designated Router (DR) was originally introduced to Link State Routing protocols to reduce the full mesh of control messaging which is otherwise required when multiple routers are connected using an Ethernet LAN segment. In this prior art, the routers attached to the LAN segment determine which of them is best qualified to be the DR, and then all the others form a control adjacency with that DR (and may be a backup DR) and no other routers. In this way, the number of control messages to support routing over the LAN segment is O(N) for N routers, rather than O(N²)/2. However, the DR still poses scalability challenges as all control packets over the control plane 110 must still connect to the DR.

BRIEF SUMMARY OF THE INVENTION

In an exemplary embodiment, a network includes a plurality of interconnected switches; a plurality of Provider Edge (PE) routers interconnected via the plurality of interconnected switches; one or more Distributed Link State Interior Gateway Route Reflectors interconnected to the PE routers; a control plane comprising the PE routers and the one or more Interior Gateway Route Reflectors; and a forwarding plane between the PE routers over the plurality of interconnected switches. In this description, the phrase "Link State Interior Gateway Route Reflectors" is equivalent to "Interior Gateway Route Reflectors" or IGRR. Optionally, the one or more Interior Gateway Route Reflectors include a single server disposed at one of the plurality of interconnected switches, and wherein each of the plurality of PE routers is communicatively coupled to the single server through the plurality of interconnected switches. Alternatively, the one or more Interior Gateway Route Reflectors include a plurality of geographically diverse servers, and wherein each of the PE routers is communicatively coupled to one of the plurality of geographically diverse servers. The forwarding plane may utilize traffic engineered Ethernet over Shortest Path Bridging-Media Access Control (SPBM). The plurality of geographically diverse servers are configured to appear as a single designated peering node to the plurality of PE routers. A logical layer two network server-server interconnect extends a messaging fabric between the geographically diverse servers to create the single designated peering node. At each of the PE routers, the forwarding plane appears as various interconnects through the plurality of interconnected switches, and wherein, at each of the PE routers, the control plane appears as interconnects to the one or more Interior Gateway Route Reflectors. The forwarding plane is logically separated from the control plane. The plurality of interconnected switches and the one or more Interior Gateway Route Reflectors replace functionality associated with a Provider router such that the network does not include the Provider router.

In another exemplary embodiment, a server includes one or more processing components; an interconnect communicatively coupling the one or more processing components; and a plurality of network interfaces communicatively coupled to a plurality of Provider Edge (PE) routers through a plurality of interconnected switches; wherein the server is configured to operate as a designated peering node to the plurality of PE routers. The server is communicatively coupled via the plurality of interconnected switches to a second server that is geographically diverse from the server. The server and the second server function together as the designated peering node. The server, the second server and the PE routers mutually communicate over the plurality of interconnected switches, which communication may preferably be achieved using Shortest Path Bridging-MAC.

In yet another exemplary embodiment, a method includes providing a plurality of Provider Edge (PE) routers over a plurality of interconnected switches; providing one or more servers configured to operate as a designated peering node; operating a forwarding plane between the plurality of PE routers over the plurality of interconnected switches; and operating a control plane between the plurality of PE routers and the designated peering node. In yet another exemplary embodiment, a method includes connecting a plurality of Provider Edge (PE) routers over a plurality of interconnected switches; providing one or more servers configured to operate as a designated peering node; operating a forwarding plane between the plurality of PE routers over the plurality of interconnected switches; and operating a control plane between the plurality of PE routers and the designated peering node. The PE routers and the one or more servers are communicatively coupled via any of Shortest Path Bridging-Virtual Local Area Network Identification (SPB-V), Virtual Private LAN Service (VPLS), and any network technology which is capable of emulating Ethernet LAN service.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides a separate Ethernet forwarding and control plane system, method, network, and architecture with a distributed Interior Gateway route reflector for the control plane system and a layer two network architecture for the forwarding system. The present invention utilizes a cloud implementation for the DR reducing peering requirements on individual components and distributing the functionality. The use of an Interior Gateway Route Reflector (via the special treatment of the "pseudo-node" and "designated router" mechanisms inherent in IS-IS and OSPF) enables a layer two cloud (SPB-M, SPB-V, Virtual Private LAN Service (VPLS), conventional IEEE 802.1) to provide scalable and robust connectivity within a routed network. The distribution of this entity improves robustness and scalability. Through the architecture of the present invention, the P router is eliminated and is replaced by layer two switches and servers. Such an architecture provides improved scaling, performance, and cost reduction.

Figure 2:
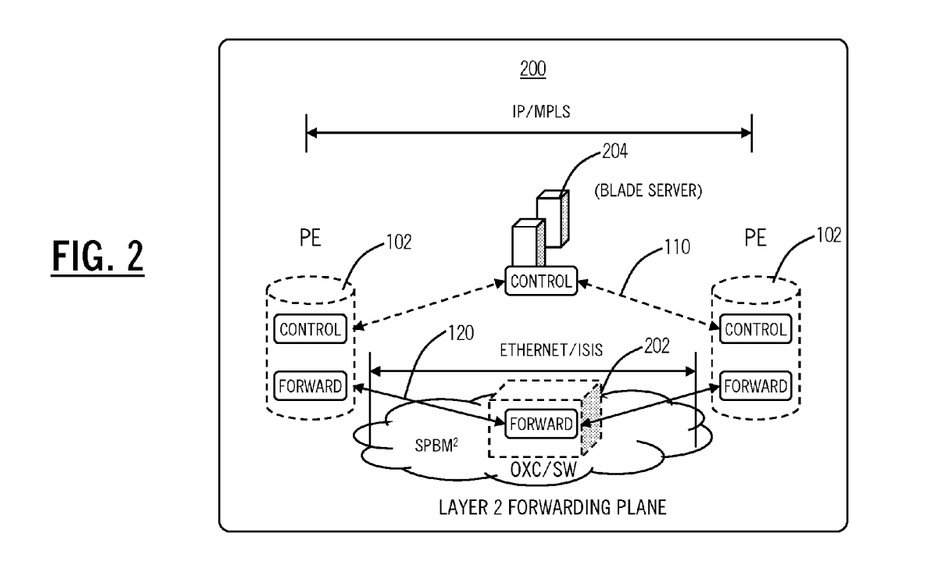
FIG. 2 is an IP/MPLS network between PE routers, switches, and distributed Interior Gateway Route Reflectors (IGRR) for a separate control and forwarding plane.

Referring to FIG. 2, in an exemplary embodiment, an IP/MPLS network 200 is illustrated between PE routers 102, switches 202, and distributed Interior Gateway route reflectors (IGRRs) 204. In comparison with the IP/MPLS network 100 of FIG. 1, the IP/MPLS network 200 separates the control plane 110 from the forwarding plane 120 and eliminates the P router 104 from the architecture. The control plane 110 includes a arrangement of the IGRR 204 which is separable from the elements of the forwarding plane, and which may be partitioned to include a plurality of servers such as blade servers as described herein. The forwarding plane 120 may operate over layer two switches such as the switch 202 with data forwarded across traffic engineered Ethernet over Shortest Path Bridging-Media Access Control (SPBM). SPBM replaces the Spanning Tree protocol traditionally used by Ethernet networks by Link State Routing (extensions of the Intermediate System To Intermediate System, IS-IS, Protocol). The switch 202 may be any of an optical cross-connect, an optical switch, a SONET/SDH device, an Optical Transport Network (OTN) device, a wave division multiplexed (WDM) device, an Ethernet switch, and combinations thereof.

Figure 3:
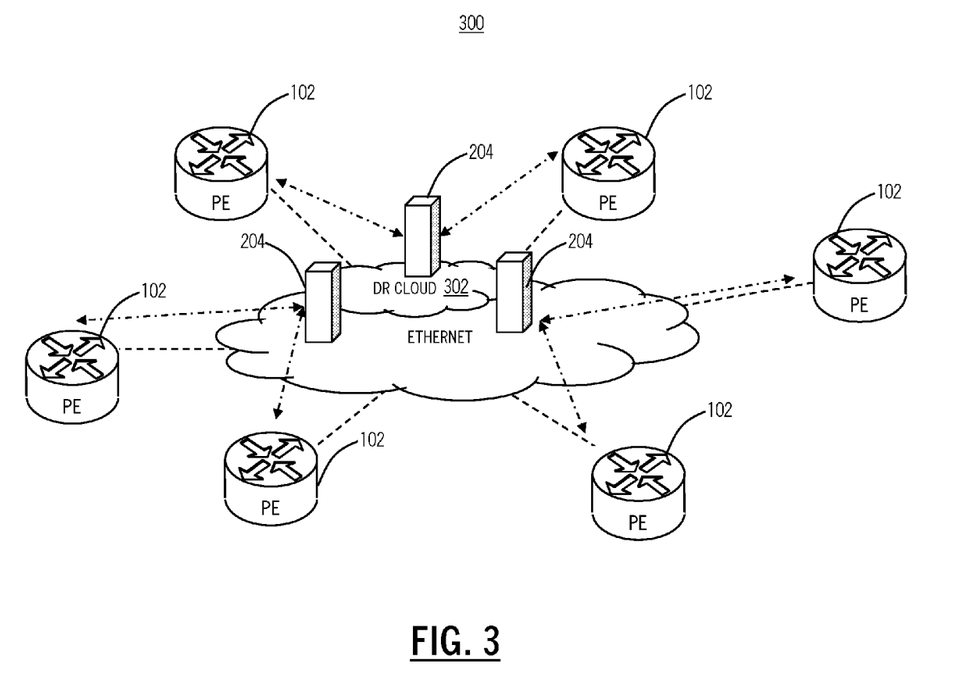
FIG. 3 is a network showing the functionality of the IGRRs for providing a distributed control plane separate from the forwarding plane.

Referring to FIG. 3, in an exemplary embodiment, a network 300 highlights the functionality of the IGRRs 204 providing a distributed control plane separate from the forwarding plane. The IGRRs 204 form a DR cloud or a designated peering node cloud 302. Specifically, each of the IGRRs 204 may be a blade server that is geographically diverse from other IGRRs 204. For example, a plurality of IGRRs 204 may be located at various physical sites in the switch 202 network. The switches 202 (not shown in FIG. 3) are communicatively coupled to the PE routers 102. Conversely, the IGRRs 204 are also communicatively coupled to the PE routers 102. Due to the DR cloud 302, there is no requirement for a hierarchical arrangement between each of the PE routers 102. Instead, each of the PE routers 102 need only connect to one of the IGRRs elements 204 in the DR cloud 302. The IGRRs 204 may geographically diverse reflector host servers that improve overall network resilience and scalability. Alternatively, the DR cloud 302 may be formed by a single IGRR 204 without geographic diversity. The network 300 may utilize independent logical Layer 2 network (SPBM) server-server interconnects to extend the messaging fabric creating a single DR in the DR cloud 302, by providing an emulation of an Ethernet LAN segment which offers multipoint-to-multipoint connectivity which extends over the entire network. Use of Ethernet MAC "anycast" (well-known multicast) addressing by the DR function facilitates the distribution of single DR instances, because when connected by an emulated LAN all IGRR components can receive a message from a single transmission. Normal Link State protocol mechanisms can advantageously be used as well, to guarantee reliable message flooding. The network 300 advantageously reduces complexity associated with the P routers 104 as well as removing the need for one particular DR and backup DR in protection scenarios. Furthermore, the network 300 and the architecture described herein is compatible with existing PE routers 102 performing their existing functionality.

Figure 4:
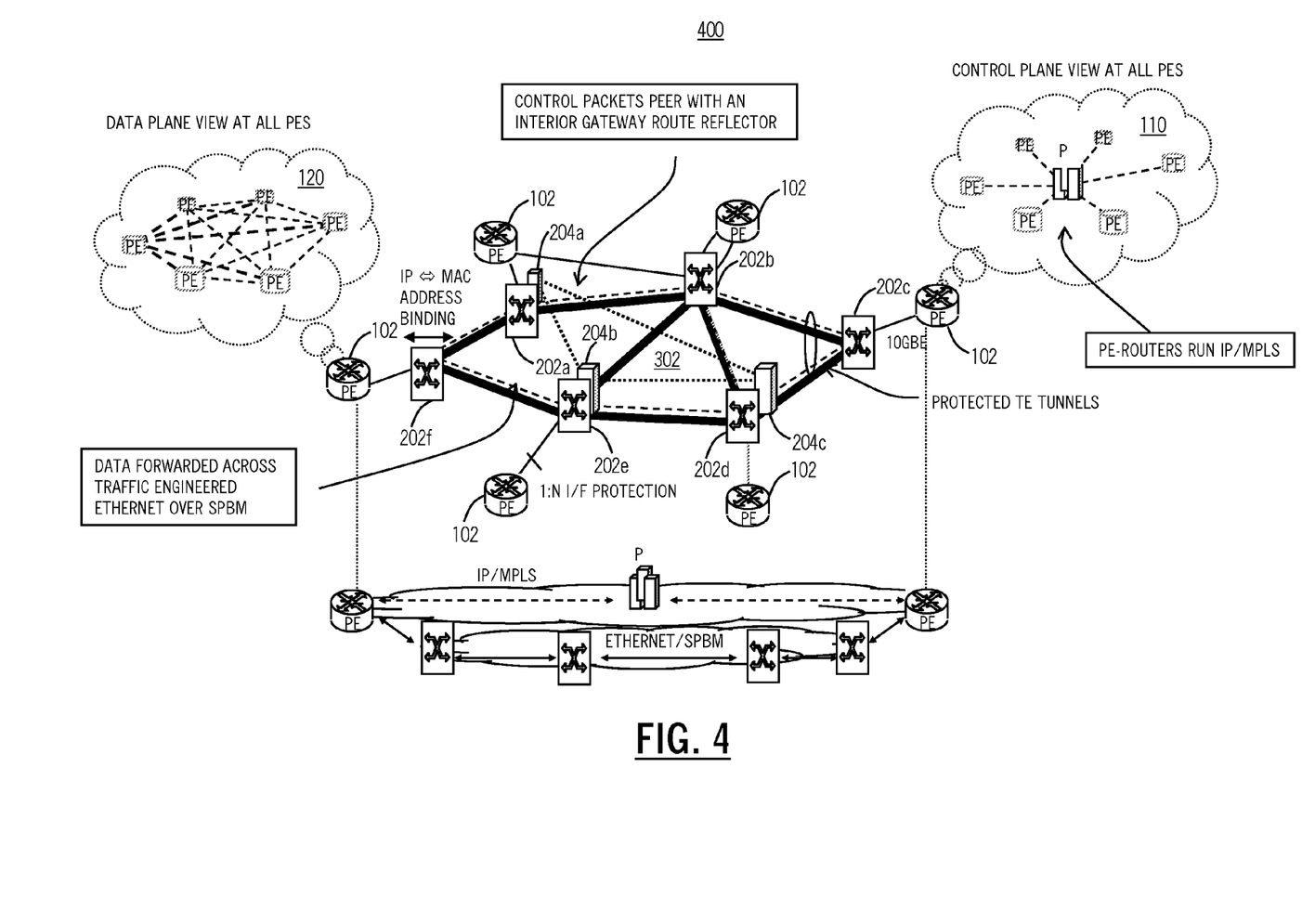
FIG. 4 is a network of an exemplary implementation of a Designated Router (DR) or designated peering node cloud with a plurality of IGRRs and switches.

Referring to FIG. 4, in an exemplary embodiment, a network 400 illustrates an exemplary implementation of the DR cloud 302 with a plurality of IGRRs 204 and switches 202. This particular exemplary embodiment includes five switches 202a-202f interconnected in a mesh architecture. Each of the switches 202a-202f is connected to a PE router 102 in various fashions. For example, the PE router 102 may be directly connected as shown to the switch 202f. The PE router 102 may be 1:1 or 1+1 connected such as shown to the switches 202a, 202b. The PE router 102 may be connected via traffic engineering (TE) tunnels as shown to the switch 202c. Also, the PE router 102 may be 1:N connected such as shown to the switch 202e. In this exemplary embodiment, the DR cloud 302 is formed based on IGRRs 204a, 204b, 204c with the IGRR 204a at the switch 202a, the IGRR 204b at the switch 202e, and the IGRR 204c at the switch 202d. The present invention contemplates one or more IGRRs 204 forming the DR cloud 302 with increasing numbers providing diversity and protection. From the perspective of each of the PE routers 102, the data forwarding plane 120 shows logical connectivity to all of the other PE routers 102 through the switches 202. The control plane 110 is viewed as a single P router that is formed by the DR cloud 302 through the IGRRs 204a, 204b, 204c.

Figure 5:
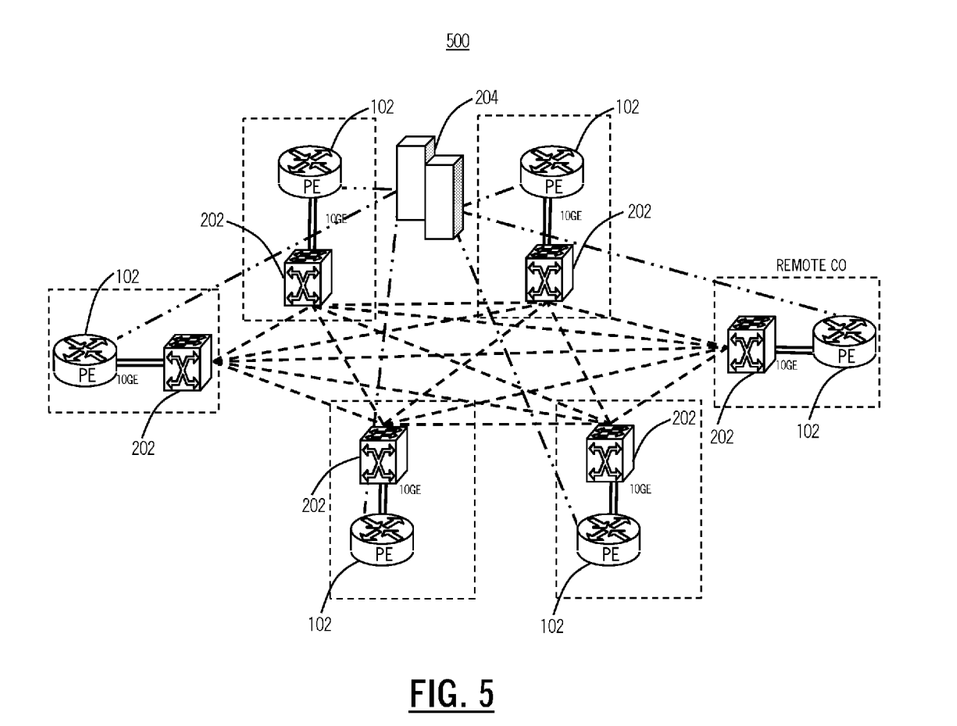
FIG. 5 is a network of another exemplary implementation of the DR cloud with a plurality of collocated IGRRs and switches.

Referring to FIG. 5, in an exemplary embodiment, a network 500 illustrates another exemplary implementation of the DR cloud 302 with a plurality of collocated IGRRs 204 and switches 202. In this exemplary embodiment, the DR cloud 302 is formed by one or more IGRRs 204 at a single location with each of the PE routers 102 connecting through the control plane 110 to the IGRRs 204. The PE routers 102 are interconnected through the switches 202 forming a full mesh at layer two. In an exemplary embodiment, the PE routers 102 may be survivable against a single port failure via a 1:N interface to the switches 202. The switches 202 may be survivable at a physical layer based on a variety of protection mechanisms including rings, 1:1 or 1+1, mesh restoration, etc. Also, the switches 202 may include survivability at layer two via Shortest Path Bridging (SPBM) routing and protection.

Figure 6:
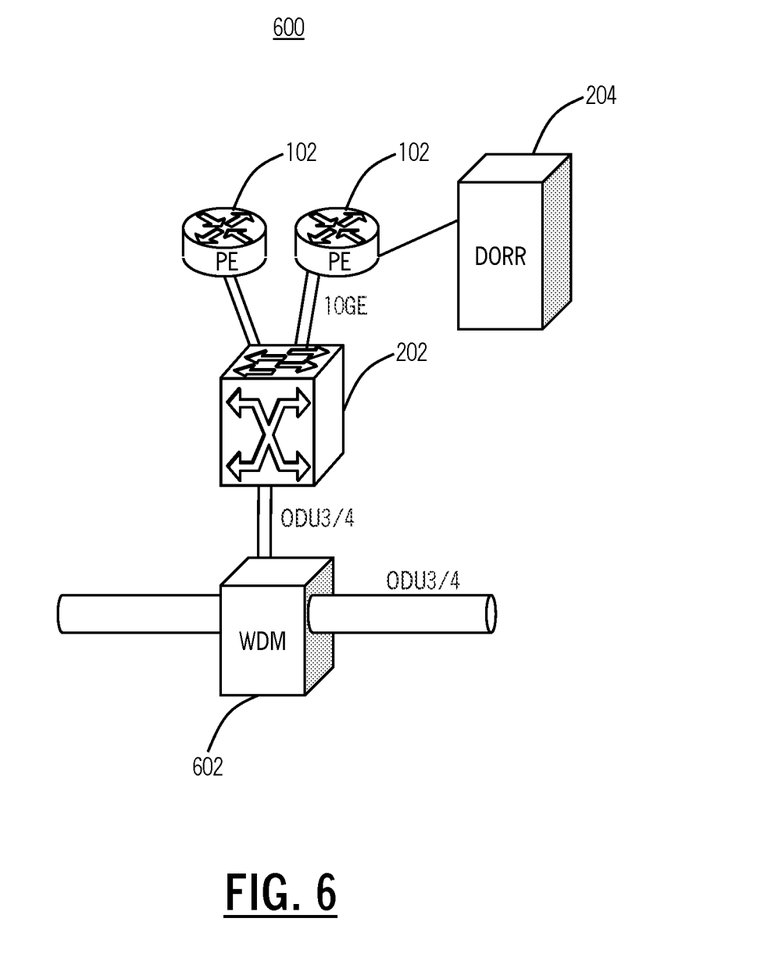
FIG. 6 is an exemplary node showing various interconnections between the PE routers, the switch, the IGRR, and a WDM platform.

Referring to FIG. 6, in an exemplary embodiment, an exemplary node 600 is illustrated showing various interconnections between the PE routers 102, the switch 202, the IGRR 204, and a WDM platform 602. The node 600 illustrates the IGRR 204 collocated physically with the PE routers 102 and the switch 202. Alternatively, the IGRR 204 may be at another node with the interconnection occurring through the switch 202. In this exemplary embodiment, the PE routers 102 interconnect to the switch via 10 GE interfaces. The switch 202 includes layer two interfaces that switch the 10 GE interfaces onto Optical Channel Data Units level k (ODUk) such as ODU3/ODU4 interfaces. In this exemplary embodiment, the WDM platform 602 is illustrated as a separate network element from the switch 202. The WDM platform 602 may include transponders, optical filters, optical amplifiers, and the like allowing a plurality of channels to be transported over fibers. Alternatively, the equivalent functionality of the WDM platform 602 may be integrated within the switch 202.

Figure 7:
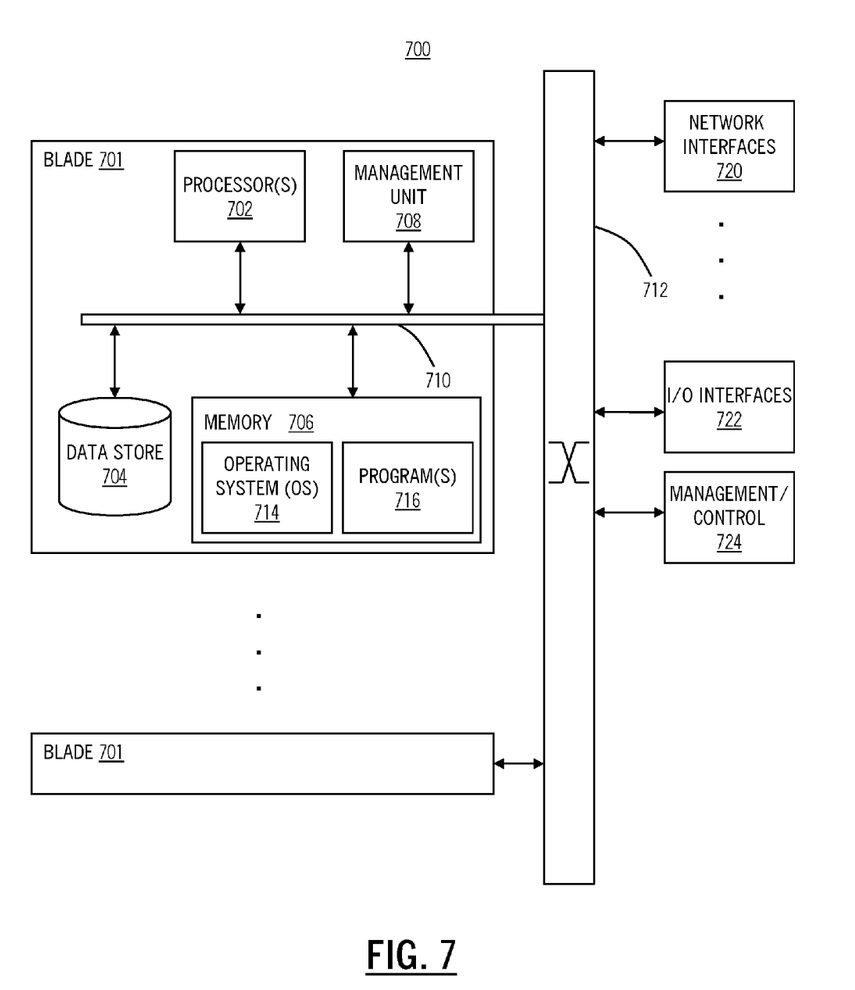
FIG. 7 is a block diagram of a server which may be utilized in an exemplary implementation of the distributed Link State Interior Gateway route reflectors.

Referring to FIG. 7, in an exemplary embodiment, a block diagram illustrates a blade server 700 which may be utilized in an exemplary implementation of the distributed Interior Gateway route reflectors 204. The blade server 700 generally includes a plurality of blades 701 that are each a digital computer that, in terms of hardware architecture, generally includes a processor 702, a data store 704, memory 706, and a management unit 708. The components (702, 704, 706, 708) are communicatively coupled in the blade 701 via a local interface 710. The local interface 710 may be, for example but not limited to, one or more buses or other wired or wireless connections, as is known in the art. The local interface 710 may have additional elements, which are omitted for simplicity, such as controllers, buffers (caches), drivers, repeaters, and receivers, among many others, to enable communications. Further, the local interface 710 may include address, control, and/or data connections to enable appropriate communications among the aforementioned components. The local interface 710 further connects to a high-speed interface 712 that interconnects each of the blades 701 as well as other components in the blade server 700. The high-speed interface 712 may be similar to the local interface 710 containing one or more buses or other wired or wireless connections, as is known in the art. In an exemplary embodiment, the blade server 700 may include a physical chassis with each of the blades 701 plugging into a backplane or midplane forming the high-speed interface 712.

The processor 702 is a hardware device for executing software instructions. The processor 702 may be any custom made or commercially available processor, a central processing unit (CPU), an auxiliary processor among several processors associated with the blade 701, a semiconductor-based microprocessor (in the form of a microchip or chip set), or generally any device for executing software instructions. When the blade 701 is in operation, the processor 702 is configured to execute software stored within the memory 706, to communicate data to and from the memory 706, and to generally control operations of the blade 701 pursuant to the software instructions. The data store 704 may be used to store data, and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 704 may incorporate electronic, magnetic, optical, and/or other types of storage media. Additionally, the data store 704 may be located on other blades 701 or on separate blades operating as shared data storage.

The memory 706 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 706 may incorporate electronic, magnetic, optical, and/or other types of storage media. Note that the memory 706 may have a distributed architecture, where various components are situated remotely from one another, but can be accessed by the processor 702. The software in memory 706 may include one or more software programs, each of which includes an ordered listing of executable instructions for implementing logical functions. The software in the memory 706 includes a suitable operating system (O/S) 714 and one or more programs 716. The operating system 714 essentially controls the execution of other computer programs, such as the one or more programs 716, and provides scheduling, input-output control, file and data management, memory management, and communication control and related services. The one or more programs 716 may be configured to implement the various processes, algorithms, methods, techniques, etc. described herein with respect to the blade server 700. Further, the blade 701 may include the management unit 708 configured to control operations of the blade 701 within the blade server 700 and on the high-speed interface 712.

The blade server 700 may include other types of blades besides the blades 701. For example, the blade server 700 may include network interface blades 720. The network interface blades 720 may be used to enable the blade server 700 to communicate on a network, such as the Internet, a data communications network, etc. For example, the blade server 700 can utilize the network interface blades 720 to communicate to/from the PE routers 102, the switches 202, etc. The network interface blades 720 may include a plurality of interfaces, for example, an Ethernet adapter (e.g., 10 BaseT, Fast Ethernet, Gigabit Ethernet, 10 GE) or a wireless local area network (WLAN) adapter (e.g., 802.11a/b/g/n). The network interface blades 720 may include address, control, and/or data connections to enable appropriate communications on the network. An I/O interface blade 722 may be used to receive user input from and/or for providing system output to one or more devices or components. User input may be provided via, for example, a keyboard, touch pad, and/or a mouse. System output may be provided via a display device and a printer (not shown). I/O interfaces can include, for example, a serial port, a parallel port, a small computer system interface (SCSI), an infrared (IR) interface, a radio frequency (RF) interface, and/or a universal serial bus (USB) interface. Also, the blade server 700 may include a management/control module 724 providing overall management and control of the blade server 700.

Figure 8:
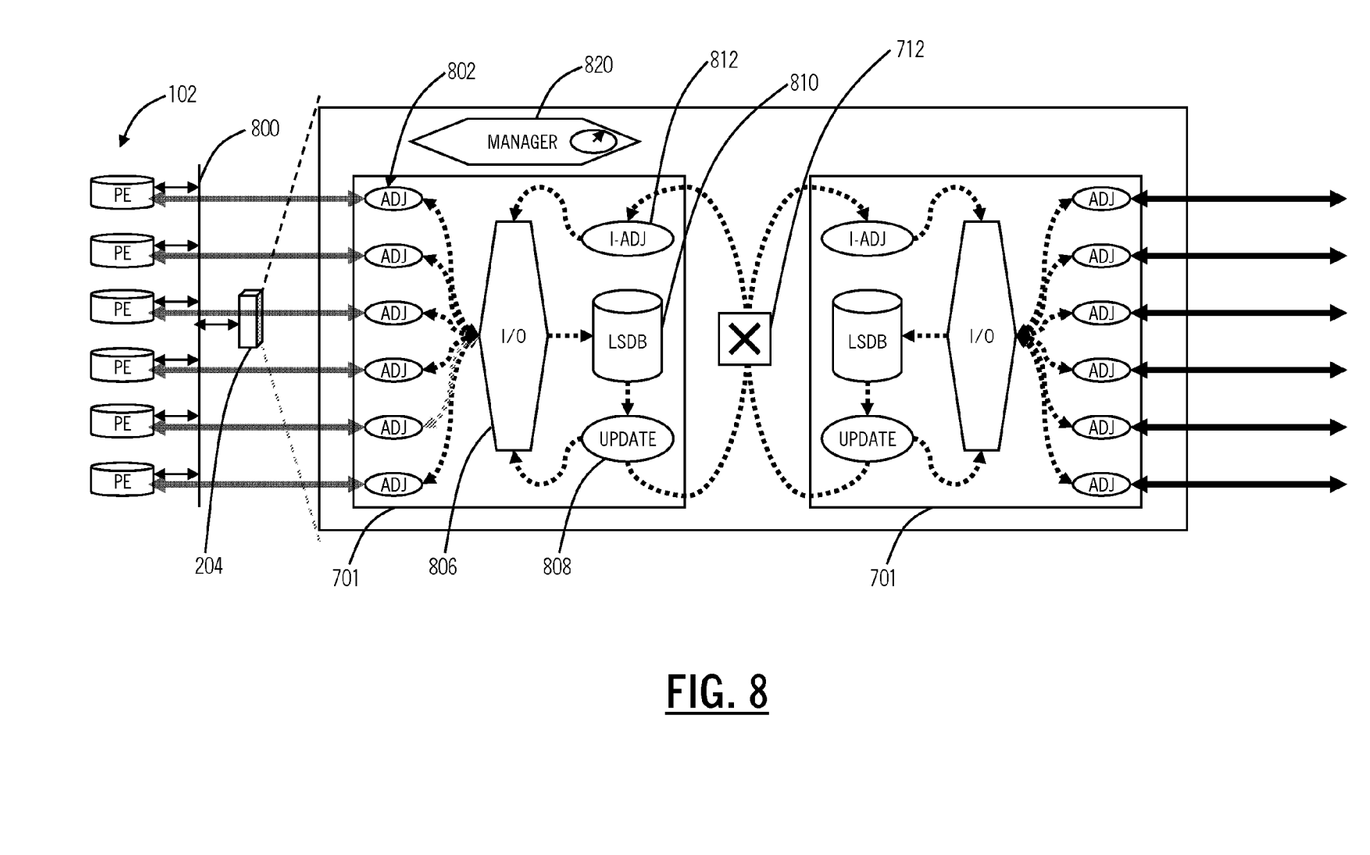
FIG. 8 is a block diagram of exemplary components in the an Interior Gateway route reflector.
Figure 9:
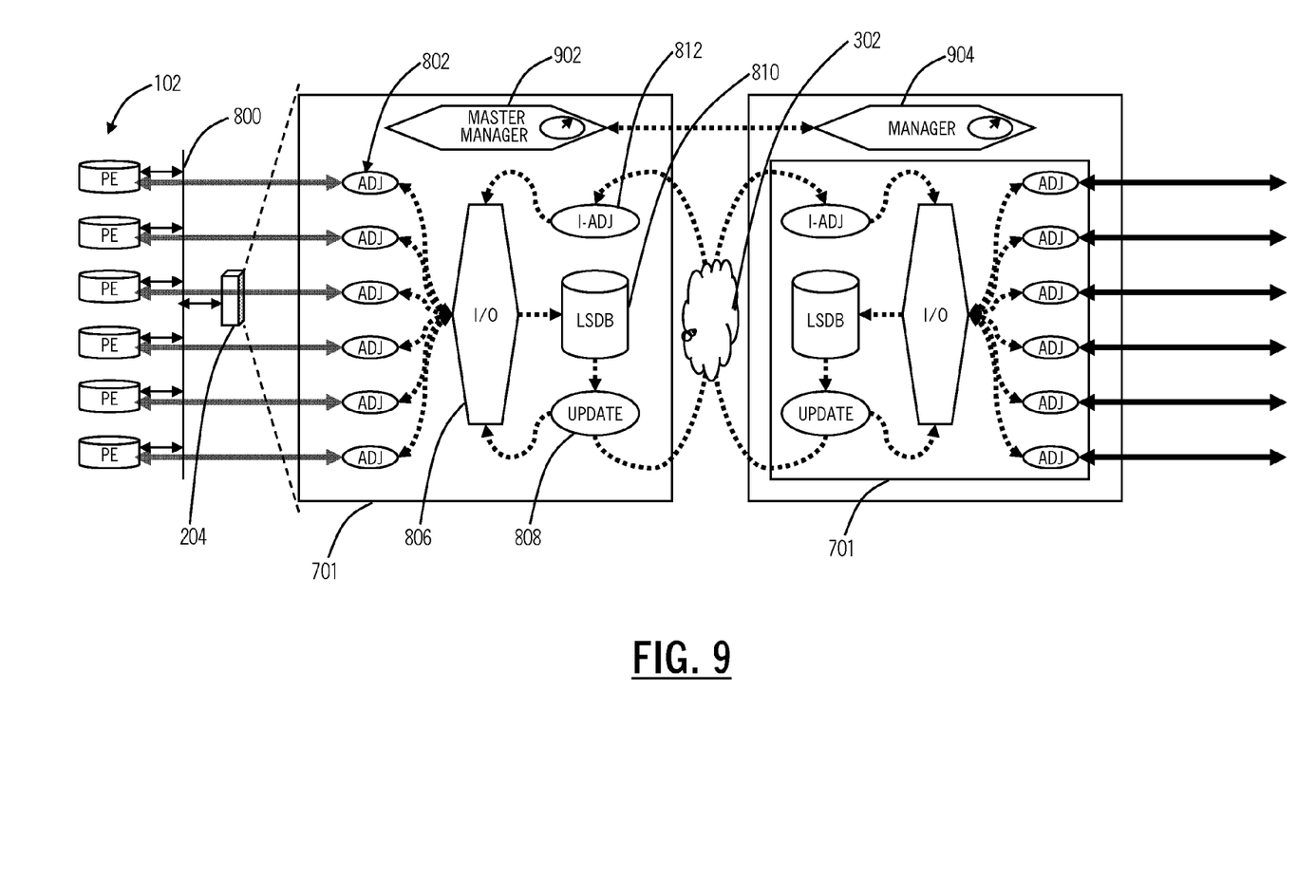
FIG. 9 is a block diagrams of exemplary components in a distributed Interior Gateway route reflectors.

Referring to FIGS. 8 and 9, in exemplary embodiments, block diagrams illustrate exemplary components in the distributed Interior Gateway route reflectors 204. FIG. 8 illustrates an example of a single, collocated Interior Gateway route reflector 204, and FIG. 9 illustrates geographically diverse distributed Interior Gateway route reflectors 204. As described herein, the distributed Interior Gateway route reflectors 204 are configured to provide a route reflector function where the control plane 110 is operated between the PE routers 102 and the IGRRs 204 separate from the forwarding plane 120. This route reflector function may be apportioned across multiple blade server processors such as in the blade server 700. The PE routers 102 are physically connected to the IGRRs 204 via a data communication network (DCN) 800. The DCN 800 may be data interfaces between the PE routers 102, the switches 202, and the IGRRs 204. Each of the PE routers 102 forms an adjacency (ADJ) 802 to the IGRRs 204 via the physical connections. The IGRRs 204 include an I/O function 806 that interfaces between the ADJ 802 and the PE routers 102, an update function 808 to update and manage the ADJ 802, a link state database (LSDB) 810 maintaining the ADJ 802, and an internal adjacency (I-ADJ) 812. The internal adjacency is the communication function which provides the interface between the distributed IGRRs elements, so that they collectively act as a single Designated Router or designated peering node when seen from the PEs. Each LSDB 810 contains Link State Advertisements (also called Link State Packets) for the entire network, and so it can locally support adjacencies with its attached PEs. The internal adjacency is the means by which different IGRRs elements exchange Link State Advertisements between each other, to propagate topology information obtained from locally attached PEs to the rest of the network, and vice versa. Collectively, the components 802, 806, 810, 812 may be implemented on a blade 701 interconnected to other blades 701 via the high-speed interface 712.

Based on its role, and hence connectivity, the Interior Gateway route reflector 204 is guaranteed to be outside the traffic forwarding path, i.e. the forwarding path 120. This may preferably be achieved by presenting all IGRR components to all PEs as if each has only a single connection to the traffic forwarding topology 120, and therefore cannot provide a useful route to anywhere for traffic. The workload of the Interior Gateway route reflector 204 is receiving/processing and generating protocol messages. The bulk of the processing is associated with maintaining routing adjacencies with the PE routers 102. Of note, processing within Link State Routing Protocols readily partitions across several functional boundaries. With inter-process message-based interfaces across those boundaries, the workload becomes straightforward to place across multiple processors.

In FIG. 8, the Interior Gateway route reflector 204 may include a manager module 820 providing management of the various blades 701. In FIG. 9, the Interior Gateway route reflector 204 is distributed geographically forming the DR cloud 302. Specifically, various blades 701 may be collocated at one site and interconnected by the high-speed interface 712 while other blades 701 may be geographically diverse separated by a network formed by the switches 202. In the example of FIG. 9, one of the blades 701 may include a master manager module 902 while the other blades 701 include a subtending manager module 904. With respect to the geographical distribution in FIG. 9, key functional boundaries lend themselves to extension across distance and this extension imposes additional well known constraints and requirements on inter-process messaging techniques. The reflector cluster, i.e. the IGRRs 204, remains outside the traffic forwarding path, but now relies on the SPBM network formed by the switches 202 for inter-server connectivity. The additional reliance on SPBM enables the PE router 102 to IGRR 204 connectivity to appear as a single designated router or designated peering node to the PE routers 102. That is, the DR cloud 302 appears as a single P router functionally.

Figure 10:
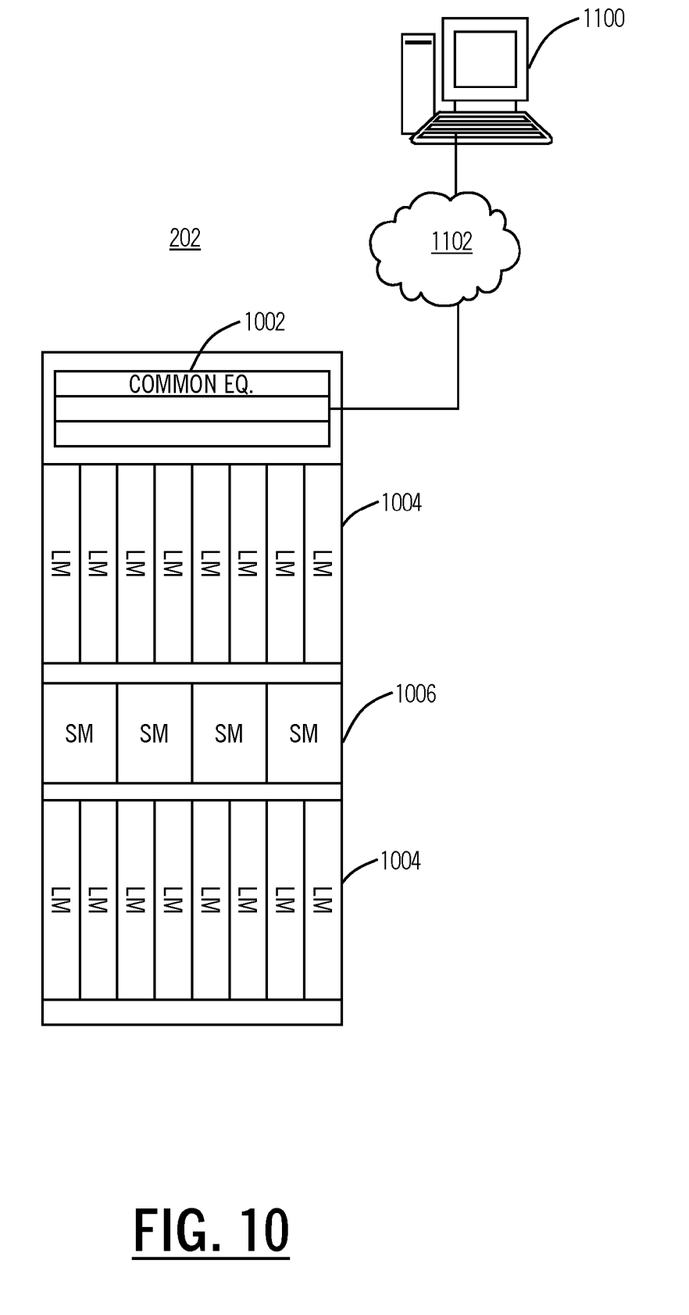
FIG. 10 is a block diagram of an exemplary switch in the various networks described herein.

Referring to FIG. 10, in an exemplary embodiment, a block diagram illustrates an exemplary switch 202 in the various networks described herein. In an exemplary embodiment, the switch 202 may be network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the switch 202 includes common equipment 1002, line modules (LM) 1004, and switch modules (SM) 1006. The common equipment 1002 may include power, a control module, operations, administration, maintenance, and provisioning (OAM&P) access, and the like. For example, the common equipment 1002 may connect to a management system 1100 through a data communication network 1102. The management system 1100 may include a network management system (NMS), element management system (EMS), or the like.

The line modules 1004 may be communicatively coupled to the switch modules 1006, such as through a backplane, mid-plane, or the like. The line modules 1004 are configured to provide ingress and egress to the switch modules 1006, and are configured to provide interfaces for the services described herein. In an exemplary embodiment, the line modules 1004 may form ingress and egress switches with the switch modules as center stage switches for a three-stage switch, e.g. three stage Clos switch. The line modules 1004 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4), GbE, 10 GbE, etc. Further, the line modules 1004 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 1004 may include DWDM interfaces, short reach interfaces, and the like, and may connect to other line modules 1004 on remote nodes 1000, NEs, end clients, and the like. From a logical perspective, the line modules 1004 provide ingress and egress ports to the node 1000, and each line module 1004 may include one or more physical ports.

The switch modules 1006 are configured to switch services between the line modules 1004. For example, the switch modules 1006 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity including SPBM support; and the like. Specifically, the switch modules 1006 may include both Time Division Multiplexed (TDM) and packet switching engines. The switch modules 1006 may include redundancy as well, such as 1:1, 1:N, etc. Collectively, the line modules 1004 and the switch modules 1006 may provide connections across the domains 102, 104, 106. Those of ordinary skill in the art will recognize the present invention contemplates use with any type of node, network element, etc. with the switch 202 illustrated as one exemplary embodiment.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network, comprising:
   a plurality of interconnected switches;
   a plurality of Provider Edge (PE) routers interconnected via the plurality of interconnected switches;
   one or more Link State Interior Gateway Route Reflectors interconnected to the PE routers;
   a control plane formed between the PE routers and the one or more Link State Interior Gateway Route Reflectors; and
   a forwarding plane between the PE routers over the plurality of interconnected switches;
   wherein the one or more Link State Interior Gateway Route Reflectors comprise a plurality of geographically diverse servers, and wherein each of the PE routers is communicatively coupled to one of the plurality of geographically diverse servers.

2. The network of claim 1, wherein the PE routers and the plurality of geographically diverse servers are communicatively coupled via Shortest Path Bridging-Media Access Control (SPB-M).

3. The network of claim 1, wherein the PE routers and the plurality of geographically diverse servers are communicatively coupled via Shortest Path Bridging-Virtual Local Area Network Identification (SPB-V).

4. The network of claim 1, wherein the PE routers and the plurality of geographically diverse servers are communicatively coupled via Virtual Private LAN Service (VPLS).

5. The network of claim 1, wherein the PE routers and the plurality of geographically diverse servers are communicatively coupled via a network technology emulating Ethernet LAN service.

6. The network of claim 1, wherein the plurality of geographically diverse servers are configured to appear as a single designated peering node to the plurality of PE routers.

7. The network of claim 6, wherein a logical layer two network server-server interconnect extends a messaging fabric between the geographically diverse servers to create the single designated peering node.

8. The network of claim 1, wherein, at each of the PE routers, the forwarding plane appears as various interconnects through the plurality of interconnected switches, and wherein, at each of the PE routers, the control plane appears as interconnects to the one or more Link State Interior Gateway Route Reflectors.

9. The network of claim 1, wherein the forwarding plane is logically separated from the control plane.

10. The network of claim 1, wherein the plurality of interconnected switches and the one or more Link State Interior Gateway Route Reflectors replace functionality associated with a Provider router such that the network does not include the Provider router.

* * * * *